June 16, 1953
J. C. HARRIS
2,642,400
SURFACE-ACTIVE COMPOSITION
Filed May 10, 1950
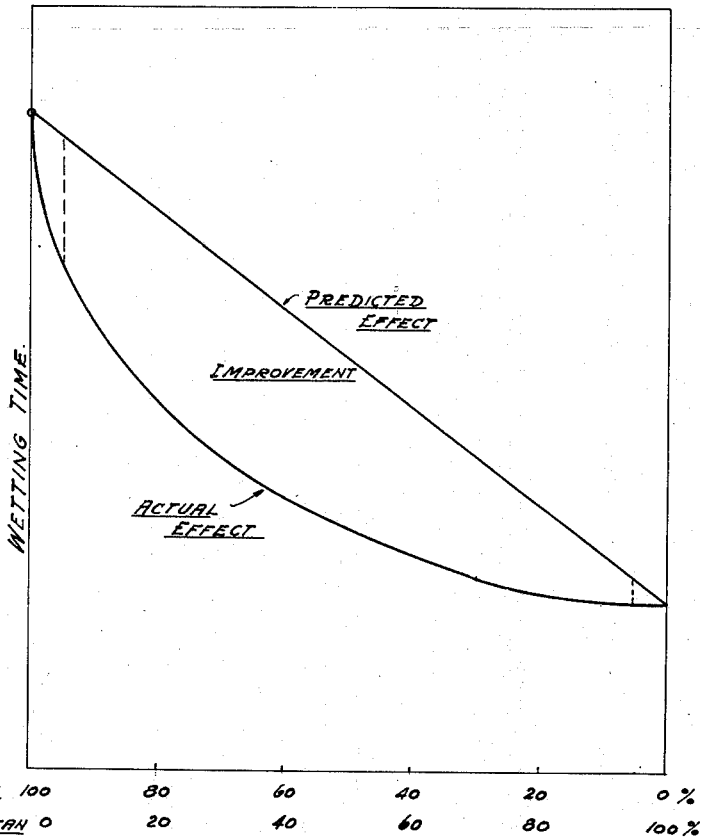
INVENTOR.
J. C. HARRIS.
BY Herman O. Bauermeister
attorney Patented June 16, 1953

2,642,400

UNITED STATES PATENT OFFICE 2,642,400

SURFACE-ACTIVE COMPOSITION

Jay C. Harris, Dayton, Ohio, assignor to Monsanto Chemical Company, St. Louis, Mo., a corporation of Delaware Application May 10, 1950, Serial No. 161,044

10 Claims. (Cl. 252—353)

The present invention relates to the manufacture of surface-active compositions. The invention likewise relates to compositions exhibiting synergistic effects.

An object of the present invention is to provide surface-active detergent materials which exhibit improvement in the speed of wetting. Another object of the present invention is to provide detergents having greater stability in storage. Still another object is to provide combinations of materials having improved detergency. Other objects and advantages of the invention will appear hereinafter.

In accordance with the present invention a surprising synergistic effect has been discovered in compositions containing sodium sulfonates of alkyl aromatic hydrocarbons, and ethylene oxide condensation products of tertiary alkyl mercaptans. According to this discovery it has been found that compositions containing from 5% to 95% of said sodium sulfonate, and from 95% to 5% of said ethylene oxide condensation products may be dissolved in water for the production of aqueous solutions having greatly improved surface-activity. One of the components of this composition is a sodium sulfonate of an alkyl-substituted aromatic hydrocarbon selected from the class consisting of benzene, toluene, and xylene, wherein the alkyl group has from 9 to 18 carbon atoms. The other component of this composition is a condensation product of a tertiary alkyl mercaptan with from 5 to 20 moles of ethylene oxide per mole of the mercaptan, including also the corresponding ethylene oxide condensation product with an alkylmercaptopropanol obtained by preliminarily reacting a tertiary alkyl mercaptan with one mole of propylene oxide.

The sulfonate component of the present composition is an aromatic sulfonate such as a sodium sulfonate of an alkylated aromatic hydrocarbon which may be prepared by condensing an aliphatic hydrocarbon having from 9 to 18 carbon atoms, with an aromatic hydrocarbon selected from the class consisting of benzene, toluene, and xylene, and thereafter sulfonating the product and neutralizing it to obtain the sodium salt. The preferred member of this group is benzene, but the compounds obtained from toluene and xylene have also been found to have desirable properties as surface-active compositions. The alkyl group is preferably of about 10 to 12 carbon atoms average length, such as may be obtained from kerosene. The kerosene may be chlorinated and the aromatic compound alkylated therewith in known manner. Another available composition of this type is produced by alkylating the aromatic hydrocarbon, with an olefin hydrocarbon averaging 9 to 18 carbon atoms in the molecule, and thereafter sulfonating and neutralizing the product. Such compounds are described in U. S. Patent 2,232,117 and 2,232,118 to Kyrides.

It has been found that surface-active agents based solely upon the sodium salts of alkylaryl sulfonates have only moderately effective wetting action, and other surface-active properties, such as surface-tension and interfacial tension.

The second component of the present composition is a condensation product of a tertiary aliphatic mercaptan with from 5 to 20 moles of ethylene oxide per mole of the mercaptan, preferably having from six to eighteen carbon atoms per molecule, and including also the corresponding ethylene oxide condensation product with an alkylmercaptopropanol obtained by preliminarily reacting a tertiary alkyl mercaptan with one mole of propylene oxide.

A preferred group of such condensation products with tertiary mercaptans may be designated by the general formula:

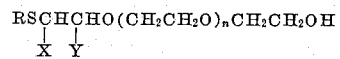

in which R is a tertiary aliphatic radical having from 6 to 18 carbon atoms, $n$ is an integer from 3 to 18. X and Y are selected from the group consisting of hydrogen and methyl and in which both X and Y are not methyl in a single compound. The above formula includes reaction products of one mole of a tertiary-dodecyl mercaptan with from 5 to 20 moles of ethylene oxide, such reaction products having the general formula:

$$RSCH_2CH_2O(CH_2CH_2O)_nCH_2CH_2OH$$

in which R is a tertiary dodecyl radical and $n$ is an integer from 3 to 18. Condensation products having this general formula are disclosed in the copending application of Milton Kosmin Serial No. 718,133, filed December 24, 1946 assigned to the same assignee as is the present application.

Compounds found useful in the present composition and within the general scope of the invention also comprise the reaction product obtained by first condensing one mole of tertiary-dodecyl mercaptan with one mole of propylene oxide to obtain a tertiary-S-dodecylmercaptopropanol and subsequent reaction of one mole of this mercapto alcohol with from 4 to 19 moles of ethylene oxide. Reaction products thus obtained have the general formula:

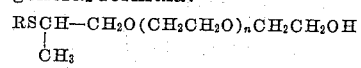

or

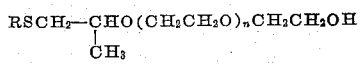

$$\text{RSCH}_2\text{—CHO(CH}_2\text{CH}_2\text{O)}_n\text{CH}_2\text{CH}_2\text{OH}$$
$$|$$
$$\text{CH}_3$$

in which R is a tertiary-dodecyl radical and $n$ is an integer of from 3 to 18. Compounds of this type are disclosed in the copending application of Milton Kosmin, Serial No. 126,913, filed November 12, 1949 assigned to the same assignee as is the present application.

The tertiary-dodecyl mercaptans which are used may be derived from petroleum aliphatic sources such as described in U. S. Patent No. 2,392,555. It is known in the art of olefin polymerization to make liquid polymers of the tertiary type having twelve carbon atoms. Thus, liquid polymers of the tertiary type and having twelve carbon atoms may be obtained by polymerizing isobutylene to tri-isobutylene, or by polymerizing isohexene to diisohexene, or by polymerizing isopropylene to tetraisopropylene. Such polymers are characterized by pronounced branching of the carbon skeletons of the molecule, and when reacted with hydrogen sulfide to form mercaptans, are predominantly of the tertiary type. Furthermore, it is possible to effectuate even greater branching of the polymer feed stock, together with a net shift of the reactive point to a central location of the molecule before mercaptan formation by utilizing a reforming or isomerizing reaction to obtain substantially complete consolidation in type to tertiary structures of the reacting molecules.

The tertiary mercaptans utilized in the instant condensation products constituting one of the components of the present combination compositions, are thus distinguished as to type from the straight-chain mercaptans, since the latter compounds have chains free from alkyl substituents.

A sample of the tertiary dodecyl mercaptan feed stock useful in carrying out the invention, when subjected to distillation by the ASTM method carried out a 5 mm. absolute pressure, showed an initial boiling point of 172° F. and 95% overhead at 207° F. The mercaptan content was found to be 96.8%; the average molecular weight was 193.3; the specific gravity (60/60° F.) was 0.8713 and a sample was found to analyze 15.9% sulfur, indicating a monomercaptan. Because the chemical bonding required to achieve the present branched-chain mercaptan-alkylene oxide compositions, mono-mercaptans are the preferred molecular type.

Examples will now be given illustrating preferred embodiments of the invention, but it will be understood that it is not to be limited by the details thereof. Parts are by weight unless otherwise indicated.

EXAMPLE 1

A mixture was prepared from 80% by weight of the sodium salt of decylbenzene sulfonate together with 20% by weight of the condensation product averaging 7.5 moles of ethylene oxide per 1 mole of tertiary-dodecyl mercaptan. This mixture was dissolved in water to give a solution of 0.0625% concentration and was tested for wetting activity by the Draves test. It was found to wet the standard sample in 21.5 seconds. The proportionate arithmetic average based upon the individual components was 34 seconds.

The above results, as well as those of Examples 2 and 3 below, are summarized in the accompanying drawing in which the curve represents the surface-activity of the mixtures of the present series of examples, and also the individual components as measured by the Draves wetting test. This test is described in the 1944 Yearbook of the American Association of Textile Chemists and Colorists, Volume XXI, page 199. The figure presents the data of the above table on a semi-logarithmic plot by means of a curved line showing the actual values obtained for the wetting time of the particular combinations of the sodium salt of the alkylaryl sulfonate in combination with the ethylene oxide condensation product with a branched chain mercaptan. For comparison there is also shown a straight line connecting the individual components. Such straight line represents the expected additive or arithmetic effect of the individual components. In contrast to such additive effect, the improvement in wetting time (e. g., faster wetting of a standard sample) represented by the ordinate dropped from any particular concentration value along a straight line to meet the curved line below, represents the improvement obtained by the synergistic effect of the combination.

EXAMPLE 2

A mixture was prepared from 60% by weight of the sodium salt of decylbenzene sulfonate together with 40% by weight of the condensation product of 7.5 moles of ethylene oxide with 1 mole of tertiary-dodecyl mercaptan. This mixture was dissolved in water to give a solution of 0.0625% concentration. It was tested for wetting activity by the Draves test and was found to wet the standard sample in 18.7 seconds. The proportionate arithmetic average based upon the individual components was 28 seconds.

EXAMPLE 3

A mixture was prepared from 40% by weight of the sodium salt of decylbenzene sulfonate and 60% by weight of the condensation product averaging 7.5 moles of ethylene oxide with 1 mole of tertiary-dodecyl mercaptan. This mixture was dissolved in water to give a solution of 0.0625% concentration which was tested for wetting activity by the Draves test. It was found to wet the standard sample in 17.7 seconds. The proportionate arithmetic average based upon the individual components was 23.5 seconds.

When the compositions described in Examples 1, 2 and 3 were made employing the condensation product of ethylene oxide with tertiary dodecylmercaptopropanol (6.5:1 mole ratio) instead of the condensation product therein described, solutions made therefrom exhibited substantially the same surface-active properties. When the present composition is employed in machine dyeing, foaming is largely reduced. Such reduction of foaming is advantageous in the wetting of fabrics and the like in the dyeing operation, since it permits more uniform and rapid dye penetration without filling the equipment with a blanket of objectionable foam.

The compositions of the present invention are of wide utility as wetting agents in operations in which solid materials such as fabrics are to be contacted with aqueous solutions, as for example, in textile scouring. Moreover, the compositions also exhibit excellent detergency, particularly by virtue of their improved wetting ability. For general washing purposes the composition is employed in concentrations varying from 0.05% to 0.5% by weight of the washing solution. The composition may be produced as a dry mixture of the two components, but it is also contemplated that other detergents, dyes, builders, fillers, etc.

may be mixed with or employed together with the composition.

When used as a detergent, the herein disclosed compositions may be employed either in the 100% active form or they may be combined with alkali metal builder salts, such as alkali metal phosphates, sulfates, carbonates, silicates or with carbohydrate materials, such as starch, carboxy methyl cellulose, etc., or mixtures of these materials. When employed with builder salts they are utilized in amount varying from about 10% to 50% or more by weight of active material in the built composition. Suitable alkali metal salts utilizable in these compositions are the disodium orthophosphate, trisodium orthophosphate, tetrasodium pyrophosphate, sodium metaphosphate, sodium tripolyphosphate, sodium carbonate, sodium bicarbonate, sodium sesquicarbonate, sodium silicate, sodium sulfate, etc.

As examples of the detersive efficiency of the composition of the present invention, the data in Table 1 below show an unexpected synergistic detergent effect. The alkylaryl sulfonate employed was the sodium sulfonate of a kerosene chloride alkylated benzene, and the condensation product was made by reacting 10 moles of ethylene oxide with one mole of a tertiary-dodecyl chain mercaptan. The detergent solutions were made up to contain 0.25% concentration of active material 300 p. p. m. hard water. The detergency test used is described by Jay C. Harris, "The Evaluation of Surface-Active Agents" in the Bulletin of the American Society of Testing Materials, May 1946.

Table 1.—*Compositions of detergent, per cent by weight*

| Alkylaryl Sulfonate, percent | Condensation Product, percent | Relative Detergency |
| --- | --- | --- |
| 0.25 | 0 | 163 |
| 0.10 | 0.15 | 192 |
| 0.05 | 0.20 | 200 |
| 0.031 | 0.22 | 205 |
| 0.025 | 0.225 | 200 |
| 0 | 0.25 | 184 |

The compositions of the present invention may also be marketed and utilized as solutions, such as aqueous solutions of suitable concentration which may be used directly or may be diluted at the point of application. For example, a concentrate for use in wetting-out operations may be provided from the following components, given as weight per cent.

| | Per cent |
| --- | --- |
| Sodium sulfonate of dodecylbenzene (technical grade containing 20% sodium sulphate) | 80 |
| Ethylene oxide condensation product (10 mole ratio) with tertiary-dodecyl mercaptan | 5 |
| Water | 15 |

The wetting-out time (Draves test) of this composition relative to the conventional sodium alkylaryl sulfonate at comparable dilutions (tested at 0.5% concentration in water) is shown below:

Table 2

| | Seconds |
| --- | --- |
| Sulfonated alkylbenzene | 10.8 |
| Composition in the proportions of the concentrate given above | 7.9 |

Other concentrations may also be used, since the concentration of the mixture in water is not a critical variable. Hence, the invention contemplates solutions broadly, and in particular, solutions containing dyes or other treating agents which it is desired to apply to solid materials by a wetting or penetrating action from a treating bath.

The present invention is not to be considered as limited by any of the examples described herein, which are given by way of illustration only, but is to be limited solely by the scope of the appended claims.

What is claimed and is desired to be protected by Letters Patent of the United States is:

1. A surface-active composition composed of a mixture of from 5 percent to 95 percent of a compound of the group consisting of the sodium alkylbenzene, alkyltoluene and alkylxylene sulfonates, wherein the alkyl group has from 9 to 18 carbon atoms and from 5 percent to 95 percent of the condensation product of 1 mole of a tertiary aliphatic mercaptan with from 5 to 20 moles of ethylene oxide.

2. A surface-active composition composed of a mixture of from 5% to 95% of a compound of the group consisting of the sodium alkylbenzene, alkyltoluene and alkylxylene sulfonates, wherein the alkyl group has 10 carbon atoms, and from 5% to 95% of the condensation product of 1 mole of a tertiary aliphatic mercaptan with from 6 to 11 moles of ethylene oxide.

3. A surface-active composition composed of a mixture consisting of from 40 percent to 90 percent of a compound of the group consisting of the sodium alkylbenzene, alkyltoluene and alkylxylene sulfonates, wherein the alkyl group has from 9 to 18 carbon atoms, together with from 10 percent to 60 percent of the condensation product of 1 mole of a $C_6$—$C_{18}$ tertiary aliphatic mercaptan with from 5 to 20 moles of ethylene oxide.

4. A surface-active composition composed of a mixture consisting of from 5 percent to 95 percent of a compound of the group consisting of the sodium alkylbenzene, alkyltoluene and alkylxylene sulfonates, and wherein the alkyl group has from 9 to 18 carbon atoms, and from 5 percent to 95 percent of the condensation product of a tertiary alkyl mercaptan derived from a polymerization olefin and having from 6 to 18 carbon atoms per molecule of the mercaptan with ethylene oxide.

5. A surface-active composition composed of a mixture of from 5% to 95% of sodium decylbenzene sulfonate and from 5% to 95% of the condensation product of 10 moles of ethylene oxide with 1 mole of tertiary-dodecyl mercaptan.

6. A surface-active composition composed of a mixture of from 40% to 90% of sodium decylbenzene sulfonate and from 10% to 60% of the condensation product of 10 moles of ethylene oxide with 1 mole of tertiary-dodecyl mercaptan.

7. A surface-active composition composed of a mixture of from 5% to 95% of sodium decylbenzene sulfonate and from 5% to 95% of the condensation product of 7.5 moles of ethylene oxide with 1 mole of tertiary-dodecyl mercaptan.

8. A surface-active composition composed of a mixture of from 40% to 90% of sodium decylbenzene sulfonate and from 10% to 60% of the condensation product of 7.5 moles of ethylene oxide with 1 mole of tertiary-dodecyl mercaptan.

9. An aqueous detergent bath comprising an aqueous solution of the composition defined in claim 1.

10. A treating bath having high wetting and penetrating properties comprising a liquid treating agent having dissolved therein 5% to 95% of a sodium dodecylbenzene sulfonate, together with 5% to 95% of a condensation product of from 5 to 20 moles of ethylene oxide per mole of tertiary-dodecyl mercaptan.

JAY C. HARRIS.

References Cited in the file of this patent

UNITED STATES PATENTS

| Number | Name | Date |
|---|---|---|
| 2,205,021 | Scheutte | June 18, 1940 |
| 2,463,497 | Smith et al. | Mar. 1, 1949 |

FOREIGN PATENTS

| Number | Country | Date |
|---|---|---|
| 364,537 | Great Britain | Dec. 22, 1931 |